June 16, 1959 R. J. FIBIKAR 2,891,241
UNBALANCE TOLERANCE LIMIT INSPECTION MACHINE
Filed Dec. 31, 1954

INVENTOR.
Robert J. Fibikar
BY
Andrus & Scales
ATTORNEYS.

United States Patent Office 2,891,241
Patented June 16, 1959

2,891,241

UNBALANCE TOLERANCE LIMIT INSPECTION MACHINE

Robert J. Fibikar, Madison, Wis., assignor to Gisholt Machine Company, Madison, Wis., a corporation of Wisconsin Application December 31, 1954, Serial No. 479,196

3 Claims. (Cl. 340—261)

This invention relates to an unbalance tolerance limit inspection machine as generally described and claimed in the copending application of Werner I. Senger, Serial No. 471,627, filed November 29, 1954, and assigned to the assignee of the present invention.

The specific embodiment illustrated in the foregoing application utilized electro-mechanical transducers for translating the mechanical vibrations into electrical pulses which were then amplified and passed to a tolerance limit detector for determining which workpieces exceeded the tolerance limit in unbalance. The detector illustrated was a meter-relay employing a switch contact adjustably set to be engaged by the meter needle when it reached the tolerance limit for magnitude of unbalance vibration in the workpiece.

The present invention utilizes the principles of the foregoing Senger unbalance inspection machine and avoids the mechanical forces encountered at the time of closing of switch contacts as where the needle is stopped by the limit contact.

In carrying out the invention the control circuit is closed at all times and the current flow therein is varied to actuate the control relay. Various means of varying the current may be employed such as resistances, magnetic inductances and also photo-electric means.

Where a beam of light is utilized through light pick-up means such as photo-electric means to effect the tolerance limit indication or measurement the current flow is varied from near zero to a maximum without switch contacts. This may be accomplished in various ways, one being to substitute the photo-electric pick-up for the switch contact in the meter-relay of the Senger machine, and another being to employ a tolerance limit device in machines that utilize a reflected light beam for amplifying and indicating the magnitude of vibration of the workpiece.

The advantages of the invention lie in the fact that the tolerance limit indication is obtained without requiring additional physical forces at the point of adjustment, and the construction is made more simple and less of a problem for maintenance. The adjustment for a predetermined tolerance limit will be maintained more accurately than is possible with devices that depend upon make and break contacts.

The present invention also provides a simple inspection machine for small workpieces whereby the operator may load and unload the machine and may sort the workpieces as he takes them from the machine in accordance with a visual or audio signal which he observes as each respective workpiece is being tested.

The accompanying drawings illustrate the invention somewhat schematically in the best mode presently contemplated for carrying out the invention.

Figure 1:
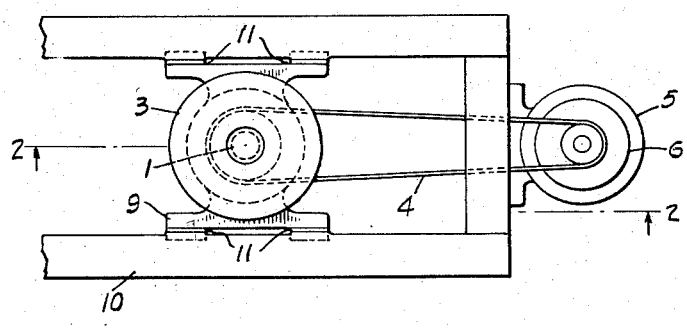
Figure 1 is a schematic top plan view of the inspection machine.
Figure 2:
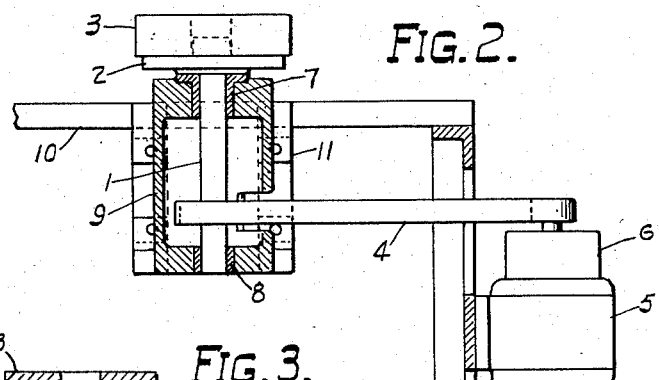
Fig. 2 is a central vertical section taken on line 2—2 of Figure 1 with the drive motor in elevation.

The machine illustrated comprises mechanism for supporting and rotating the workpiece at a speed to effect vibration from unbalance therein, and mechanism for measuring the unbalance vibrations and indicating whether the workpiece exceeds the tolerence limit for unbalance.

The work supporting and rotating mechanism may be of any of the constructions found in unbalance determining machines, that illustrated constituting a vertical spindle 1 having an adapter 2 at its upper end for supporting and rotating a workpiece 3. The spindle 1 is suitably driven by a belt 4 from an electric motor 5 and which has a suitable clutch and brake mechanism 6 effecting intermittent drive for the spindle under the control of the operator so that the spindle is stopped during loading and unloading of workpieces.

The spindle is mounted in bearings 7 and 8 in a cradle 9 which is suspended from a frame 10 by suitable strips 11 which permit lateral vibration of the cradle in a given plane. The magnitude of vibrations of the cradle generally corresponds to the magnitude of unbalance of the workpiece.

Figure 3:
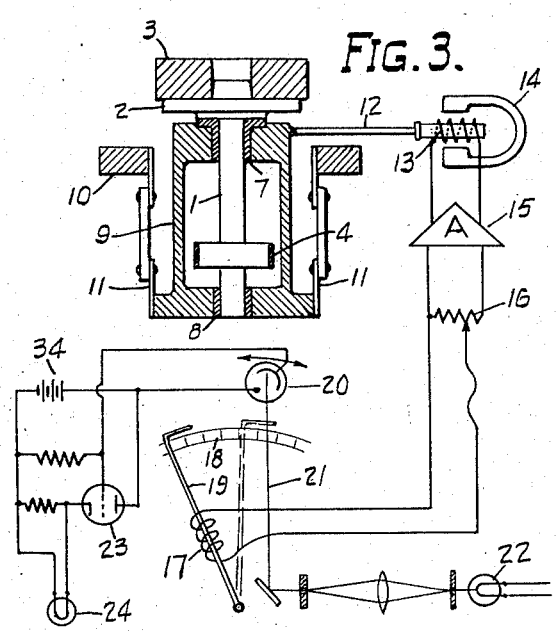
Fig. 3 is a vertical section taken at right angles to that of Fig. 2 and showing the circuit diagram and detector device.
Figure 4:
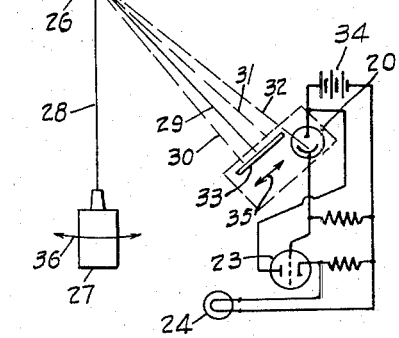
Fig. 4 is a schematic illustration of the application of the invention to a machine employing a reflected light beam for amplifying the vibration indication.

The unbalance measuring mechanism may comprise various transducer means and amplifying means, that shown in Fig. 3 being a mechanical-electrical transducer and that shown in Fig. 4 being a mechanical-light transducer.

Referring to Fig. 3 the cradle 9 has a rod 12 extending outwardly horizontally therefrom in the direction of the vibrations of the workpiece and cradle, and which carries an electro-magnetic coil 13 disposed between the opposite poles of a permanent magnet 14. Coil 13 is connected in circuit with the input of an amplifier 15 so that as the coil is vibrated it cuts magnetic lines of force and generates a series of electro-motive forces of voltage pulses that are fed to the amplifier.

The output of the amplifier 15 is connected through the potentiometer 16 to the actuating coil 17 of a voltmeter 18 which has the usual pointer needle 19.

For the purposes of detecting whether the unbalance in a given workpiece exceeds a predetermined tolerance limit the needle 19 of voltmeter 18 is made to alter the amount of light passing to a photo-electric cell 20, as by cutting the light beam 21 normally passing from light source 22 to the cell.

The photo-electric cell 20 is connected to control the amplifier tube 23 which in turn operates a signal such as discontinuing the light 24 placed where the operator can readily observe or detect the same.

The predetermined tolerance limit at which the needle 19 will effect the operation of photo-electric cell 20 may be adjusted for different types of workpieces as by varying potentiometer 16 or by moving light beam 21 and photo-electric cell 20 relative to the path of the needle 19.

Referring to Fig. 4 the rod 12 actuates a pivoted crank arm 25 which carries a mirror 26. A light source 27 is made to direct a narrow beam 28 of light against the mirror 26 so that pivotal oscillations of the mirror in response to vibrations of the workpiece and cradle result in a reflected light beam 29 oscillating on opposite sides of a norm as indicated by dotted lines 30 and 31. The angle between lines 30 and 31 or between either line and the norm will give a basis for determining the magnitude of the unbalance in the workpiece.

The photo-electric cell 20 is disposed to receive the light beam 29 when the latter is oscillated to position 32 where it passes the edge of a shield 33, a position which corresponds to the tolerance limit of unbalance for the workpiece.

The photo-electric cell 20 is connected as in Fig. 3 to control the amplifier tube 23 which actuates a signal light 24 from battery 34. The difference lies in the fact that in Fig. 3 the signal light 24 is normally energized and only discontinues as a signal when the light beam 21 is prevented from reaching cell 20 by reason of the needle reaching the setting for the tolerance limit, whereas in Fig. 4 the signal light 24 is normally de-energized and is only energized as a signal when the light beam 29 passes the edge of shield 33 and reaches cell 20.

The predetermined tolerance limit adjustment for the construction of Fig. 4 can be obtained by adjusting the angular position of mirror 26 on crank arm 25 or by adjusting the angular position of cell 20 and shield 33 relative to the mirror as indicated by arrow 35, or by adjusting the light source 27 relative to the mirror as indicated by arrow 36.

The invention provides a construction wherein the control is readily adjusted and the adjustment is free from mechanical forces tending to alter the same.

Various embodiments and modes of carrying out the invention may be employed within the scope of the accompanying claims which particularly point out and distinctly set forth the subject matter regarded as the invention.

I claim:

1. In an unbalance inspection machine having transducer means for detecting and amplifying the unbalance vibrations of a rotating workpiece, a light source disposed to emit a control beam, a photo-electric cell disposed to receive said beam of light, means responsive to said transducer means for controlling the transmission of said beam to said photo-electric cell in accordance with a predetermined tolerance limit for unbalance in said workpiece, and signal means controlled by said photo-electric cell for indicating which of a series of successive workpieces being inspected have unbalance exceeding said tolerance limit.

2. The construction of claim 1 in which said responsive means comprises a voltmeter having a needle adapted to alter the light beam going to the photo-electric cell when the needle reaches a predetermined tolerance limit position.

3. The construction of claim 1 in which said transducer means comprises a mirror disposed to pivotally oscillate in magnitude corresponding to the magnitude of unbalance in the workpiece to reflect a light beam from said light source to said photo-electric cell, and said responsive means comprises a shield disposed to alter a reflected light beam going to the photo-electric cell at an angular position for the light beam corresponding to a predetermined tolerance limit for unbalance in the workpiece.

References Cited in the file of this patent
UNITED STATES PATENTS

| | | |
|---|---|---|
| 352,647 | Ghegan | Nov. 16, 1886 |
| 1,518,786 | Griswold | Dec. 9, 1924 |
| 1,552,982 | Bradner | Sept. 8, 1925 |
| 1,706,857 | Mathe | Mar. 26, 1929 |
| 1,859,020 | Brown | May 17, 1932 |
| 1,988,658 | Kovalsky | Jan. 22, 1935 |
| 2,074,840 | Greentree | Mar. 23, 1937 |
| 2,091,303 | Brelsford | Aug. 31, 1937 |
| 2,149,735 | Henderson | Mar. 7, 1939 |
| 2,167,488 | Ohlson | July 25, 1939 |
| 2,290,606 | Burnett | July 21, 1942 |
| 2,322,561 | Bevins et al. | June 22, 1943 |
| 2,329,715 | Grier | Sept. 21, 1943 |
| 2,337,535 | Acs | Dec. 28, 1943 |
| 2,478,663 | Masket et al. | Aug. 9, 1949 |
| 2,678,558 | Pischel | May 18, 1954 |
| 2,728,220 | Willner | Dec. 27, 1955 |